(12) United States Patent
Hu et al.

(10) Patent No.: US 11,092,866 B2
(45) Date of Patent: Aug. 17, 2021

(54) DISPLAY PANEL AND MANUFACTURING METHOD THEREOF, DRIVING METHOD AND DISPLAY DEVICE

(71) Applicant: BOE TECHNOLOGY GROUP CO., LTD., Beijing (CN)

(72) Inventors: Hehe Hu, Beijing (CN); Xiaochen Ma, Beijing (CN); Guangcai Yuan, Beijing (CN); Ce Ning, Beijing (CN); Xin Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/631,331

(22) PCT Filed: Jul. 18, 2019

(86) PCT No.: PCT/CN2019/096537
§ 371 (c)(1),
(2) Date: Jan. 15, 2020

(87) PCT Pub. No.: WO2020/015701
PCT Pub. Date: Jan. 23, 2020

(65) Prior Publication Data
US 2021/0063793 A1    Mar. 4, 2021

(30) Foreign Application Priority Data
Jul. 19, 2018 (CN) .................. 201810795914.X

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136222* (2021.01)

(58) Field of Classification Search
CPC ............ G02F 1/1368; G02F 1/136209; G02F 1/136222; G02F 1/136295; G02F 1/13439; G02F 1/1339
See application file for complete search history.

(56) References Cited

U.S. PATENT DOCUMENTS

| 6,016,174 A * | 1/2000 | Endo ..................... G02F 1/1368 257/59 |
| 6,674,093 B1 * | 1/2004 | Tanaka .............. G02F 1/134363 257/72 |

(Continued)

FOREIGN PATENT DOCUMENTS

| CN | 104238204 A | 12/2014 |
| CN | 105093764 A | 11/2015 |

(Continued)

OTHER PUBLICATIONS

Elibol et al. "Localized heating and thermal characterization of high electrical resistivity silicon-on-insulator sensors using nematic liquid crystals"Appl. Phys. Lett. 93, 131908 (2008).*

(Continued)

*Primary Examiner* — Hoan C Nguyen
(74) *Attorney, Agent, or Firm* — Nath, Goldberg & Meyer; Joshua B. Goldberg

(57) ABSTRACT

The present disclosure provides a display panel and a manufacturing method thereof, a driving method and a display device. The display panel includes: a base substrate and a thin film transistor on a surface of the base substrate. The thin film transistor includes: a gate, and a source and a drain arranged along a first direction, and a first passivation layer covering the gate, the source and the drain. a space region in which liquid crystal molecules are filled is formed in the first passivation layer. The space region is between the (Continued)

source and the drain. The source and the drain are configured to control rotation of the liquid crystal molecules.

16 Claims, 11 Drawing Sheets

(56) References Cited

U.S. PATENT DOCUMENTS

| | | | |
|---|---|---|---|
| 7,626,206 B2* | 12/2009 | Ahn | H01L 27/12 |
| | | | 257/79 |
| 9,171,933 B2* | 10/2015 | Lee | G02F 1/136209 |
| 2011/0285929 A1* | 11/2011 | Kubota | G02F 1/134363 |
| | | | 349/43 |
| 2017/0153368 A1 | 6/2017 | Yoon et al. | |
| 2018/0120608 A1 | 5/2018 | Ha et al. | |
| 2018/0335676 A1 | 11/2018 | Gan | |
| 2019/0004351 A1 | 1/2019 | Cao et al. | |

FOREIGN PATENT DOCUMENTS

| | | |
|---|---|---|
| CN | 105867697 A | 8/2016 |
| CN | 106773205 A | 5/2017 |
| CN | 106814495 A | 6/2017 |
| CN | 107065357 A | 8/2017 |
| CN | 108008560 A | 5/2018 |
| CN | 108663864 A | 10/2018 |
| KR | 10-2017-0078243 A | 7/2017 |

OTHER PUBLICATIONS

First Office Action dated Apr. 20, 2020, for corresponding Chinese application 201810795914.X.

* cited by examiner

First Direction →

DISPLAY PANEL AND MANUFACTURING METHOD THEREOF, DRIVING METHOD AND DISPLAY DEVICE

CROSS-REFERENCE TO RELATED APPLICATION

This is a National Phase Application filed under 35 U.S.C. 371 as a national stage of PCT/CN2019/096537, filed Jul. 18, 2019, an application claiming the benefit of patent application No. 201810795914.X filed with the Chinese Patent Office on Jul. 19, 2018, the entire content of each of which is incorporated herein by reference.

TECHNICAL FIELD

Embodiments of the present disclosure relate to the field of display technology, in particular to a display panel and a manufacturing method thereof, a driving method and a display device.

BACKGROUND

In recent years, AR and VR display technologies have shown great market prospects. To implement AR and VR display technologies, display devices need to have ultra-high Pixels Per Inch (PPI). LCD display devices have advantages such as a longer service life and lower cost, but it is very difficult to implement ultra-high PPI in the LCD display devices.

SUMMARY

According to one aspect of the present disclosure, there is provided a display panel, including: a base substrate and a thin film transistor on the base substrate. The thin film transistor includes: a gate, and a source and a drain arranged in a first direction, and a first passivation layer covering the gate, the source and the drain. The first passivation layer is provided with a space region in which liquid crystal molecules are filled. The space region is between the source and the drain. The source and the drain are configured to control rotation of the liquid crystal molecules.

In an embodiment, the thin film transistor further includes an active layer and an insulating layer, the gate is on the base substrate; and the insulating layer is on a side of the gate distal to the base substrate. The insulating layer covers the gate and the base substrate; and the active layer is located on a side of the insulating layer distal to the base substrate.

In an embodiment, the source and the drain extend from an edge of the active layer onto the insulating layer along a second direction crossing the first direction. The space region is at least between portions of the source and the drain beyond an edge of the active layer.

In an embodiment, a distance from a highest point of the space region to a surface of the base substrate is less than a distance from a highest point of the source and the drain to the surface of the base substrate.

In an embodiment, the first passivation layer is further provided a hole through which the liquid crystal molecules are filled into the space region.

In an embodiment, the display panel further includes a second passivation layer. The second passivation layer is on a side of the first passivation layer distal to the base substrate and seals the hole.

In an embodiment, the display panel further includes a planarization layer. The planarization layer is on a side of the second passivation layer distal to the base substrate.

In an embodiment, the display panel further includes a color filter. The color filter is on a side of the planarization layer distal to the base substrate. The color filter includes a color resist layer and a black matrix layer. An orthographic projection of the color resist layer on the base substrate is overlapped with an orthographic projection of the space region between the portions on the base substrate. The black matrix layer is between adjacent color resist layers to separate the adjacent color resist layers.

In an embodiment, the display panel further includes a third passivation layer. The third passivation layer is on a side of the color filter distal to the base substrate.

In an embodiment, a distance between the source and the drain ranges from about 10 nm to 50 μm, and each of the source and the drain has a height in a range of about 10 nm to 20 μm.

According to one aspect of the present disclosure, there is provided a display device, including: the display panel as described above, a backlight module, a first polarizer and a second polarizer.

According to one aspect of the present disclosure, there is provided a method for manufacturing a display panel, including: providing a base substrate; forming a gate, and a source and a drain arranged along a first direction on the base substrate; forming a first passivation layer covering the gate, the source and the drain, wherein a space region is disposed in the first passivation layer; and filling the space region with liquid crystal molecules. The space region is between the source and the drain; and the source and the drain are configured to control rotation of the liquid crystal molecules.

In an embodiment, the step of forming the gate, and the source and the drain arranged along the first direction on the base substrate includes: forming the gate on the base substrate; forming an insulating layer on a side of the gate distal to the base substrate, the insulating layer covering the gate and the base substrate; forming an active layer on a side of the insulating layer distal to the base substrate; and forming the source and the drain on a side of the active layer distal to the base substrate.

In an embodiment, the step of forming the source and the drain on the side of the active layer distal to the base substrate includes: forming the source and the drain such that the source and the drain extend from an edge of the active layer onto the insulating layer along a second direction crossing the first direction. The space region is at least between portions of the source and the drain beyond an edge of the active layer.

In an embodiment, the step of forming the source and the drain on the side of the active layer distal to the base substrate further includes: forming the source and the drain such that a distance between the source and the drain ranges from about 10 nm to 50 μm, and each of the source and the drain has a height in a range of about 10 nm to 20 μm.

In an embodiment, a distance from a highest point of the space region to a surface of the base substrate is less than a distance from a highest point of the source and the drain to the surface of the base substrate.

In an embodiment, the step of filling the space region with the liquid crystal molecules includes: forming a hole in communication with the space region in the first passivation layer; and filling the space region with the liquid crystal molecules through the hole.

In an embodiment, the method further includes: forming a second passivation layer sealing the hole on a side of the first passivation layer distal to the base substrate.

In an embodiment, the method further includes: forming a planarization layer on a side of the second passivation layer distal to the base substrate.

In an embodiment, the method further includes: forming a color filter on a side of the planarization layer distal to the base substrate. The color filter includes a color resist layer and a black matrix layer. An orthographic projection of the color resist layer on the base substrate is overlapped with an orthographic projection of the space region between the portions on the base substrate. The black matrix layer is between adjacent color resist layers to separate the adjacent color resist layers.

In an embodiment, the method further includes: forming a third passivation layer on a side of the color filter distal to the base substrate.

According to one aspect of the present disclosure, there is provided a method for driving a display panel, including: applying a driving voltage to the gate of the thin film transistor so that the thin film transistor is turned off; applying a data voltage to the source and the drain of the thin film transistor so that the liquid crystal molecules between the source and the drain rotate.

BRIEF DESCRIPTION OF DRAWINGS

The accompanying drawings, which provide a further understanding of the disclosure and constitute a part of the specification, are used in conjunction with the following specific embodiments to explain the disclosure, but are not intended to limit the disclosure. In the drawings.

DETAILED DESCRIPTION

Hereinafter, specific embodiments of the present disclosure will be described with respect to the accompanying drawings. It is to be understood that the embodiments described herein are merely used for describing and explaining the present disclosure rather than limiting of the present disclosure.

Liquid Crystal Display (LCD) panels and backlight modules are important components in LCD devices. An LCD device is formed by providing a backlight source on a side of an LCD panel, thereby realizing image display.

In general, a display panel includes: an array substrate, a color filter substrate, and a liquid crystal layer disposed between the array substrate and the color filter substrate. The display panel is formed by aligning and assembling the array substrate and the color filter substrate to form a cell. Due to the need of the alignment and assembly technology, the liquid crystal layer is prone to malposition during a bending process, resulting in a relatively low pixel density. Therefore, it is very difficult to implement ultra-high PPI.

Figure 1A:
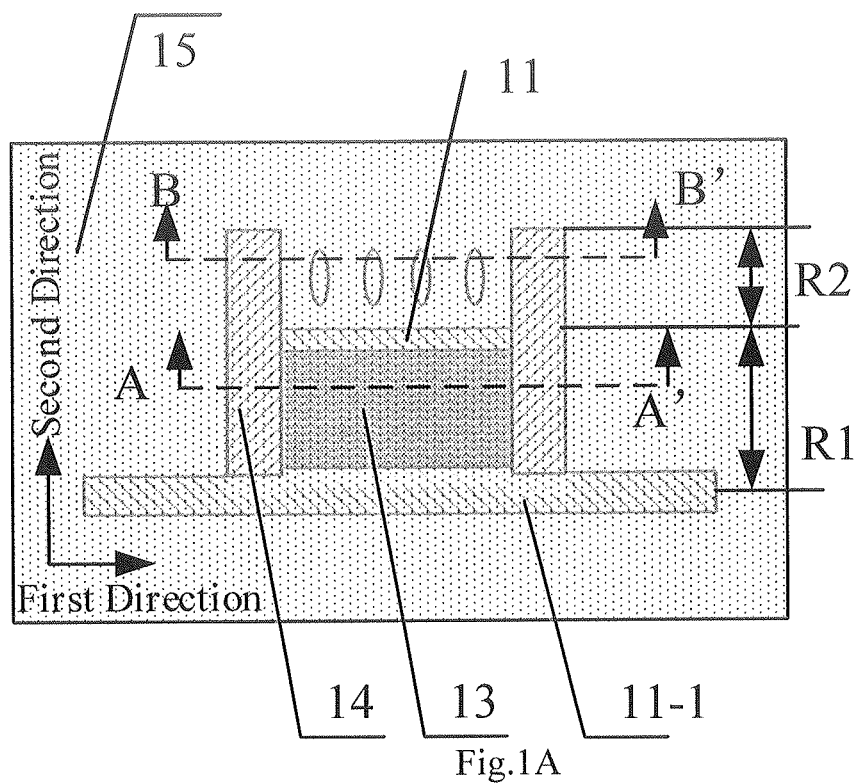
FIG. 1A is a top view of a structure of a display panel according to an embodiment of the present disclosure.
Figure 1B:
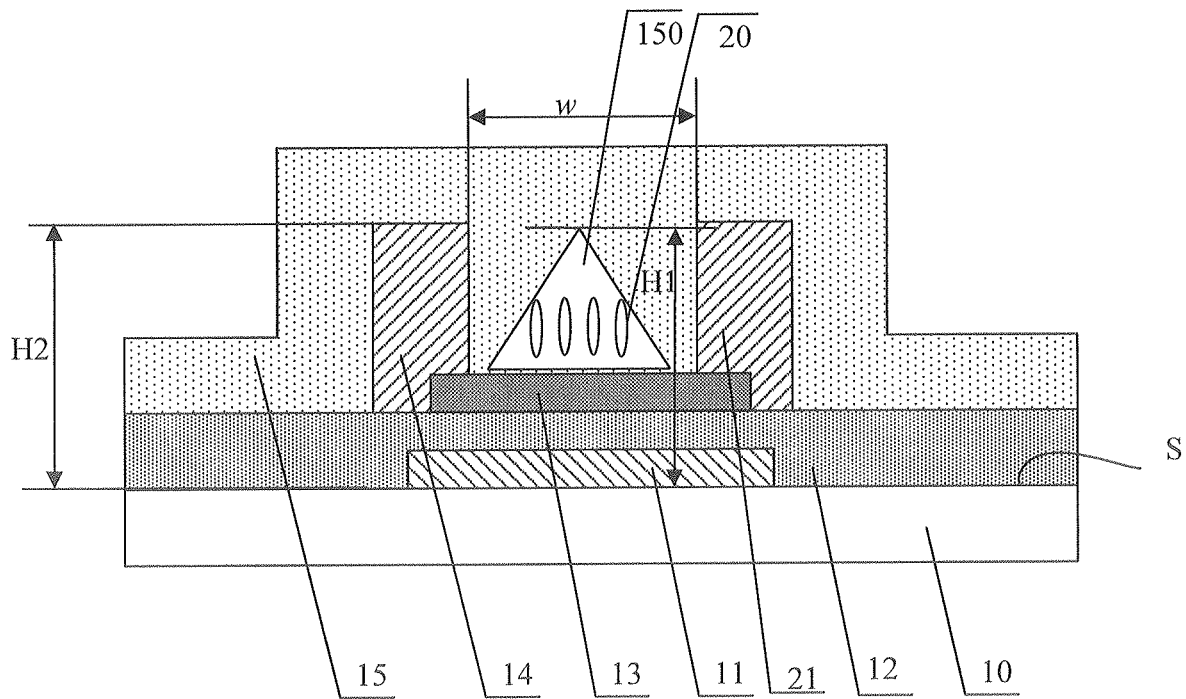
FIGS. 1B and 1C are cross-sectional views taken along line AA' in FIG. 1A.
Figure 1C:
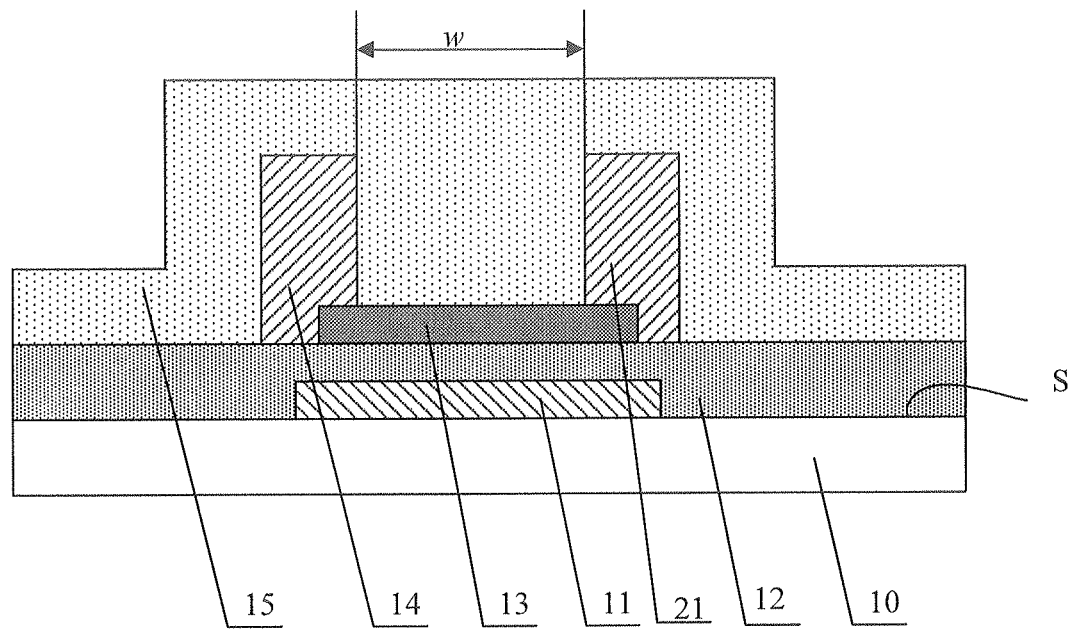
Figure 1D:
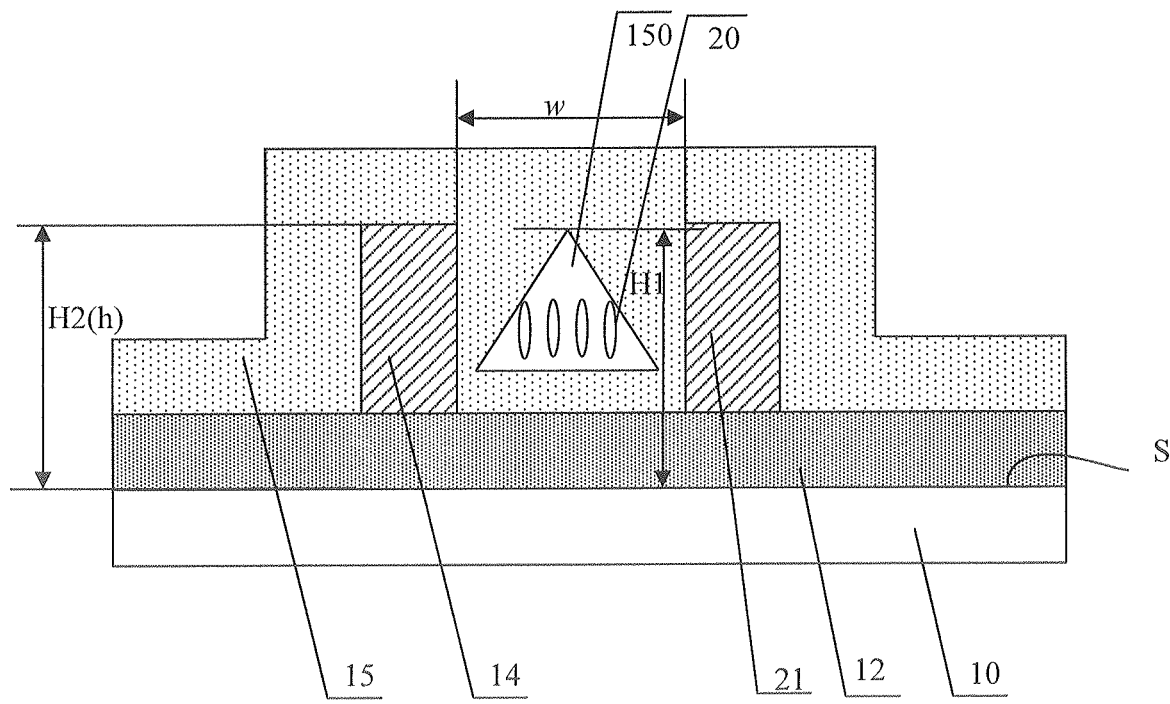
FIG. 1D is a cross-sectional view taken along line BB' in FIG. 1A.

FIG. 1A is a top view of a structure of a display panel according to an embodiment of the present disclosure. FIG. 1B or 1C is a cross-sectional view taken along line AA' in FIG. 1A. FIG. 1D is a cross-sectional view taken along line BB' in FIG. 1A. As shown in FIGS. 1A to 1D, a display panel according to an embodiment of the present disclosure includes: a base substrate 10 and a thin film transistor disposed on a main surface S of the base substrate 10. The thin film transistor includes: a gate 11, an insulating layer 12, an active layer 13, and a source 14 and a drain 21 arranged in sequence along a first direction on the main surface S of the base substrate 10, and a first passivation layer 15.

The gate 11 is located on the main surface S of the base substrate 10, for example, the gate is in direct contact with the main surface S. The insulating layer 12 is located on a surface of the gate 11 distal to the base substrate 10. The insulating layer covers the gate 11 and the entire base substrate 10. The active layer 13 is located on a surface of the insulating layer 12 distal to the base substrate 10. A gate line 11-1 is connected to the gate 11.

The source 14 and the drain 21 extend from an edge of the active layer 13 onto the surface of the insulating layer 12 (e.g., in direct contact with the insulating layer 12) in a second direction crossing or perpendicular to the first direction. In an embodiment, the source 14 and the drain 21 extend beyond another edge of the active layer, which is opposite to the edge of the active layer, along a direction crossing the gate line 11-1 and extend onto the surface of the insulating layer 12 (e.g., in direct contact with the insulating layer 12).

A region where the active layer 13 or the gate 11 is located is defined as a light blocking region R1. Extension portions of the source 14 and the drain 21 extend from the light blocking region R1 beyond the said another edge of the active layer 13. The extension portions of the source 14 and the drain 21 define a sub-pixel region R2, and serve as edges of the sub-pixel region R2. That is, the extension portions of the source 14 and the drain 21 have a length equal to a length or width of the sub-pixel region R2, and the length of the extension portions may be designed according to the pixel size. The sub-pixel region R2 is adjacent to the light blocking region R1. As described later herein, a color resist layer is to be formed in the sub-pixel region R2, and a black matrix layer is to be formed in the light blocking region R1.

A space region 150 in which liquid crystal molecules 20 are filled is formed in the first passivation layer 15, and the source 14 and the drain 21 are configured to control rotation of the liquid crystal molecules 20.

The space region 150 may be in or not in the light blocking region R1. FIG. 1B shows a case where the space region 150 is located in the light blocking region R1. FIG. 1C shows a case where the space region 150 is not located the light blocking region R1.

Referring to FIG. 1D, the space region 150 is located in the sub-pixel region R2 defined by the extension portions of the source 14 and the drain 21.

In the case where the space region 150 is located in the light blocking region R1, the space region 150 in the light blocking region R1 and the space region 150 in the sub-pixel region R2 are in communication with each other and formed as one piece.

It should be noted that in some embodiments, the inventive concept of the present disclosure is described taking a case where the space region 150 is located in the light blocking region R1 as an example, but the case where the space region 150 is not located the light blocking region R1 also falls within the protection scope of the present application.

The material of the base substrate 10 may be a transparent material such as glass, plastic, quartz, or polyimide, which is not limited in the embodiments of the disclosure.

The thin film transistor may have a top gate structure or a bottom gate structure. It should be noted that FIG. 1B illustrates an example where the thin film transistor has a bottom gate structure, but the disclosure is not limited thereto.

The material of the first passivation layer 15 may be silicon oxide and/or silicon dioxide, but the embodiments of the present disclosure are not limited thereto.

The space region 150 may be disposed between the source 14 and the drain 21 so that the source 14 and the drain 21 are configured to control rotation of the liquid crystal molecules 20.

In an embodiment, as shown in FIGS. 1B and 1D, in both the light blocking region R1 and the sub-pixel region R2, a distance H1 from a highest point of the space region to the main surface S of the base substrate is less than a distance H2 from a highest point of the source and the drain to the main surface S of the base substrate. Therefore, all the liquid crystal molecules 20 in the space region 150 may rotate under influence of a voltage between the source 14 and the drain 21.

The space region 150 may have a shape of any one of a square, a triangle, and a sphere. However, the shape of the space region 150 is not limited thereto.

Figure 7A:
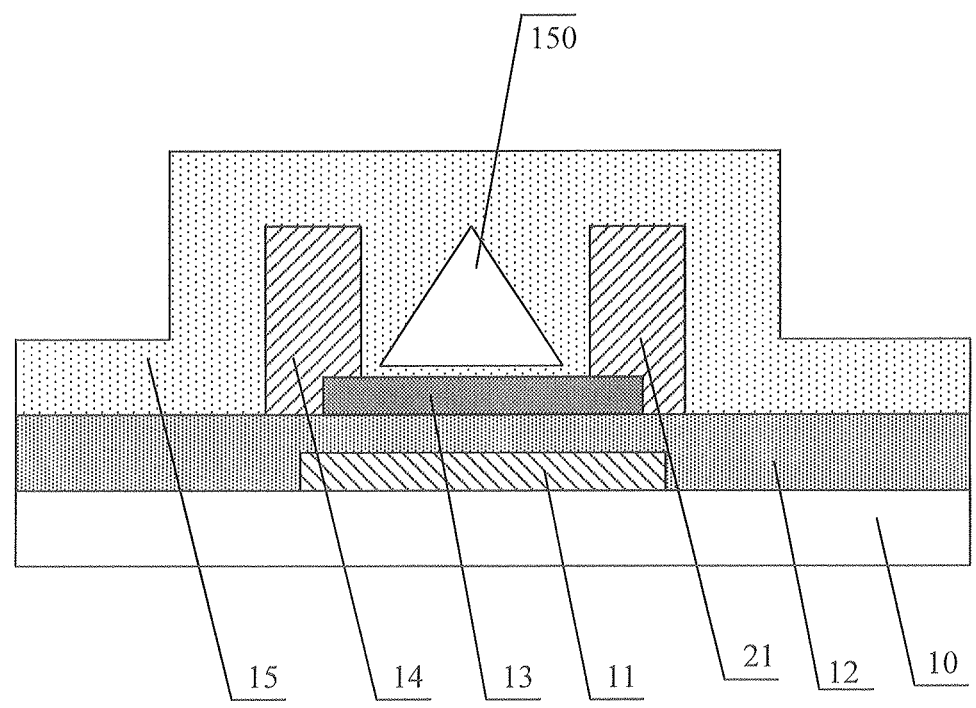
Figure 7B:
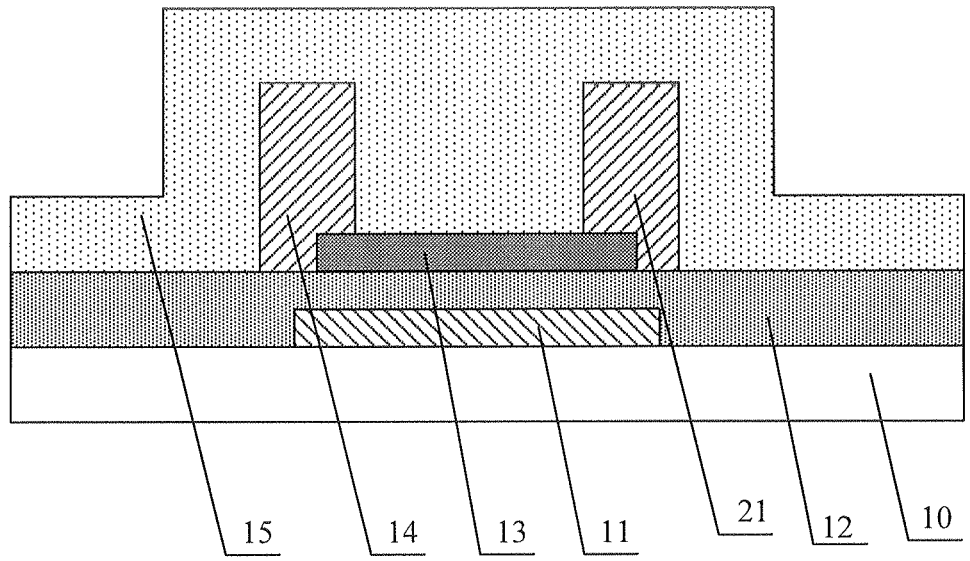
Figure 7C:
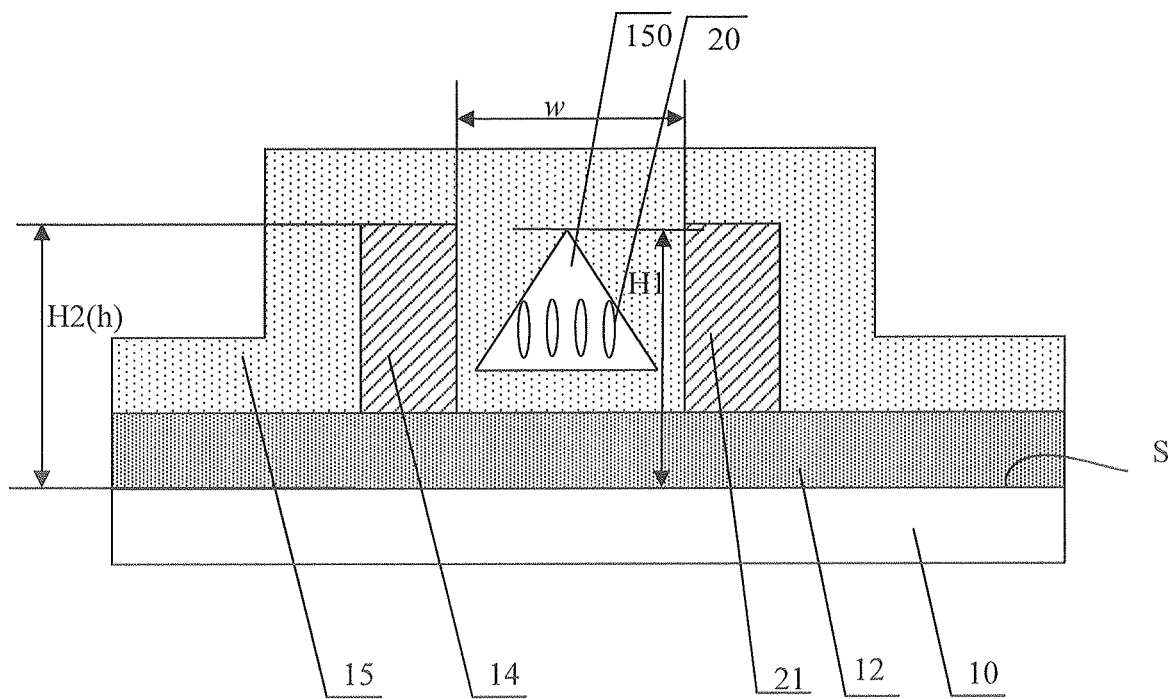
Figure 7D:
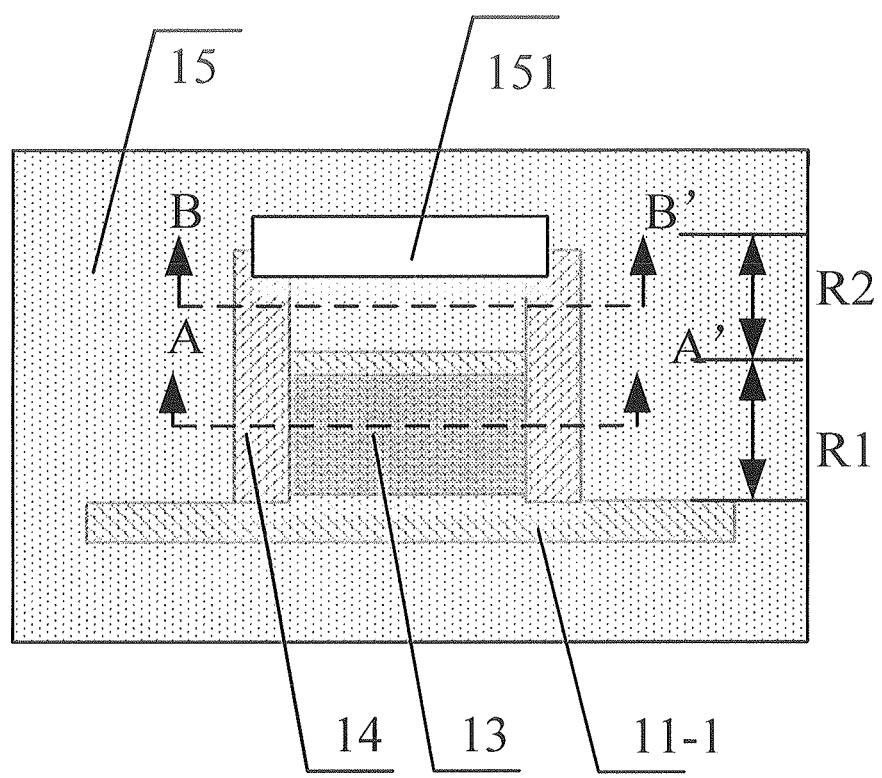

A crystal filling hole or hole 151 as shown in FIG. 7D is disposed in the first passivation layer 15. The hole 151 is in communication with the space region, and the liquid crystal molecules 20 are filled into the space region 15 through the hole 151.

A distance w between the source 14 and the drain 21 is about 10 nm to 50 μm, and each of the source 14 and the drain 21 has a height h of about 10 nm to 20 μm.

When the thin film transistor is turned off due to agate voltage of the thin film transistor, a voltage is applied to the source and the drain so that a voltage difference exists between the source and the drain. Therefore, the liquid crystal molecules rotate, light transmits through the liquid crystal molecules, and pixels corresponding to the liquid crystal molecules emit light for display. When the thin film transistor is turned on due to the gate voltage of the thin film transistor, the source voltage and the drain voltage are the same as each other, and the liquid crystal molecules do not rotate. Therefore, light cannot transmit through the liquid crystal molecules, and the pixels corresponding to the liquid crystal molecules do not emit light.

The display panel of the embodiment of the disclosure includes: the base substrate, and the thin film transistor disposed on the base substrate. The thin film transistor includes: the gate 11, the insulating layer 12, the active layer 13, the source 14, the drain 21, and the first passivation layer 15. a space region 150 in which liquid crystal molecules are filled is formed in the first passivation layer, and the source 14 and the drain 21 are configured to control rotation of the liquid crystal molecules. The display panel in the embodiment of the disclosure avoids use of the alignment and assembly process, thereby simplifying the manufacturing process, ensuring that the liquid crystal layer is prone to malposition during the bending process, improving the pixel density of the liquid crystal display device, and achieving a better display effect.

Figure 2A:
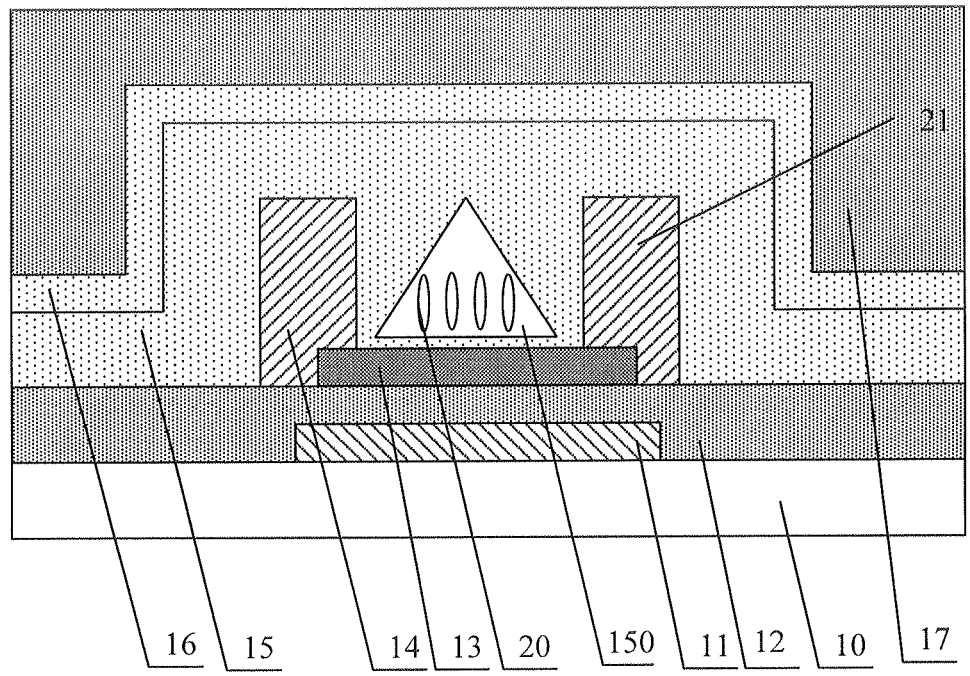
FIGS. 2A and 2B are cross-sectional views of a structure of a display panel according to an embodiment of the present disclosure.
Figure 2B:
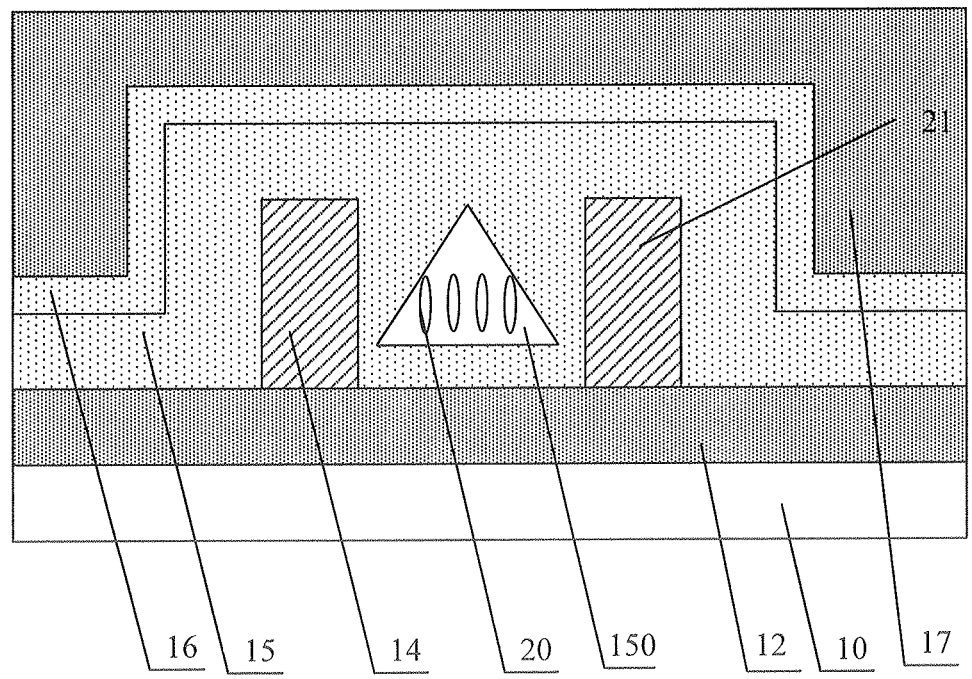

FIGS. 2A and 2B are cross-sectional views of a structure of a display panel provided in an embodiment of the present disclosure. As shown in FIGS. 2A and 2B, the display panel according to the embodiment of the present disclosure further includes: a second passivation layer 16 and a planarization layer 17.

The second passivation layer 16 is disposed in the light blocking region R1 and the sub-pixel region R2. The second passivation layer 16 is disposed on a side of the first passivation layer 15 distal to the base substrate 10 and configure to seal the hole 151; while the planarization layer 17 is dispose on a side of the second passivation layer 16 distal to the base substrate 10.

The material of the second passivation layer 16 includes: silicon oxide and/or silicon nitride.

The material of the planarization layer 17 includes: any one of silicon oxide, silicon nitride and resin, and the planarization layer 17 is configured to planarize the thin film transistor so as to facilitate fabrication of other film layers thereon.

Figure 3A:
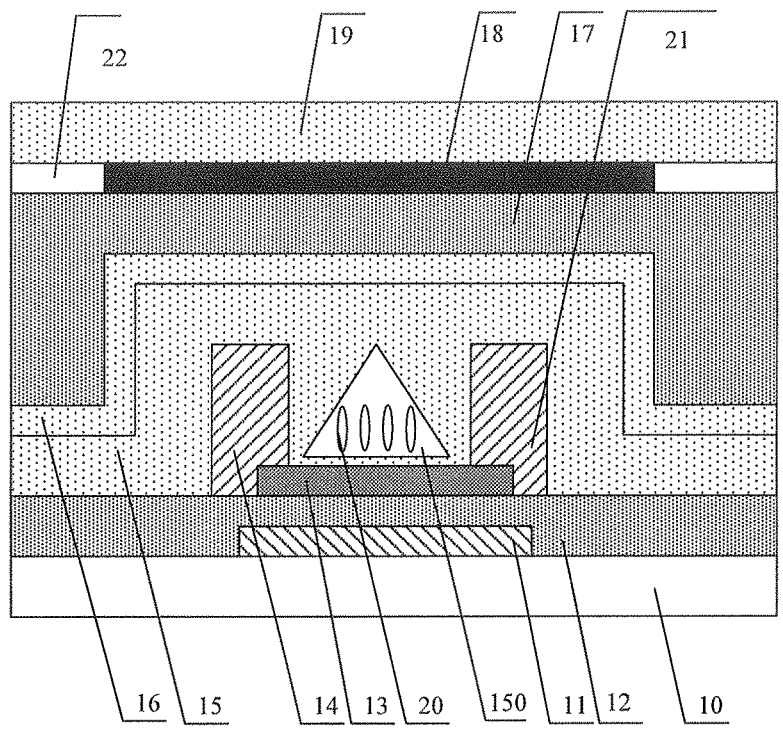
FIGS. 3A and 3B are cross-sectional views of a structure of a display panel according to an embodiment of the present disclosure.
Figure 3B:
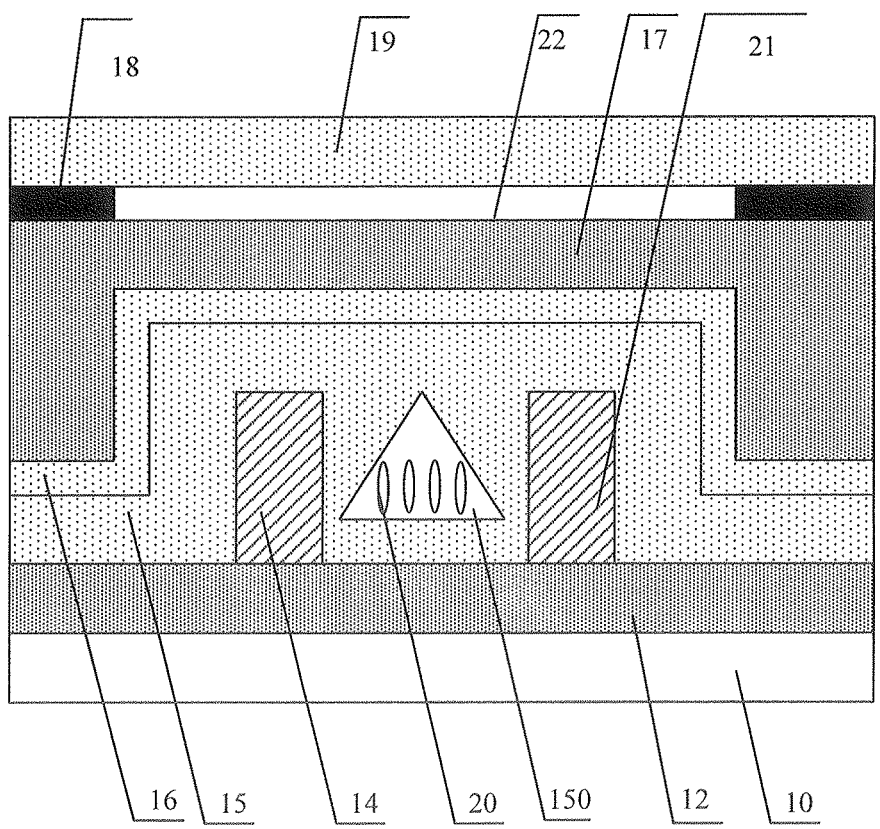
Figure 3C:
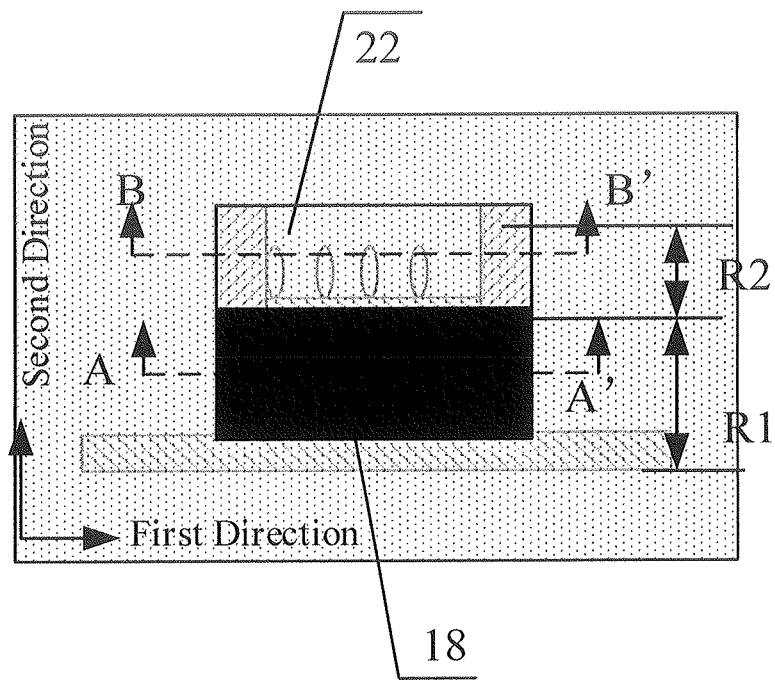
FIG. 3C is a plan view of the display panel shown in FIGS. 3A and 3B.

FIGS. 3A and 3B are cross-sectional views of a structure of a display panel provided in an embodiment of the present disclosure. FIG. 3C is a plan view of the display panel shown in FIGS. 3A and 3B. FIG. 3A is a cross-sectional view taken along line AA' in FIG. 3C. FIG. 3B is a cross-sectional view taken along line BB' in FIG. 3C. As shown in FIGS. 3A, 3B, and 3C, the display panel provided in the embodiment of the present disclosure further includes: a color filter.

The color filter is disposed in the light blocking region R1 and the sub-pixel region R2. The color filter is disposed on a side of the planarization layer 17 distal to the base substrate 10. The color filter includes a color resist layer 22 and a black matrix layer 18. The color resist layer 22 is located in one sub-pixel region R2, and an orthographic projection of the color resist layer 22 on the base substrate 10 is inside the sub-pixel region R2. The orthographic projection of the color resist layer 22 on the base substrate 10 is overlapped with an orthographic projection of the space region 150 in the sub-pixel region R2 on the base substrate 10. The black matrix layer 18 is located in the light blocking region R1. An orthographic projection of the black matrix layer 18 on the base substrate 10 is overlapped with an orthographic projection of the gate 11 (or the active layer 13) on the base substrate. The black matrix layer 18 is located between adjacent color resist layers 22 to space the adjacent color resist layers 22.

As shown in FIGS. 3A and 3B, the display panel further includes a third passivation layer 19.

The third passivation layer 19 is located in the light blocking region R1 and the sub-pixel region R2. The third passivation layer 19 is disposed on a side of the color filter distal to the base substrate 10 to protect the color filter.

A sum of thicknesses of layers, except for the base substrate 10, of the display panel according to the embodiment of the present disclosure (i.e., a thickness of the entire cell) is about 200 μm to 300 μm.

Figure 4:
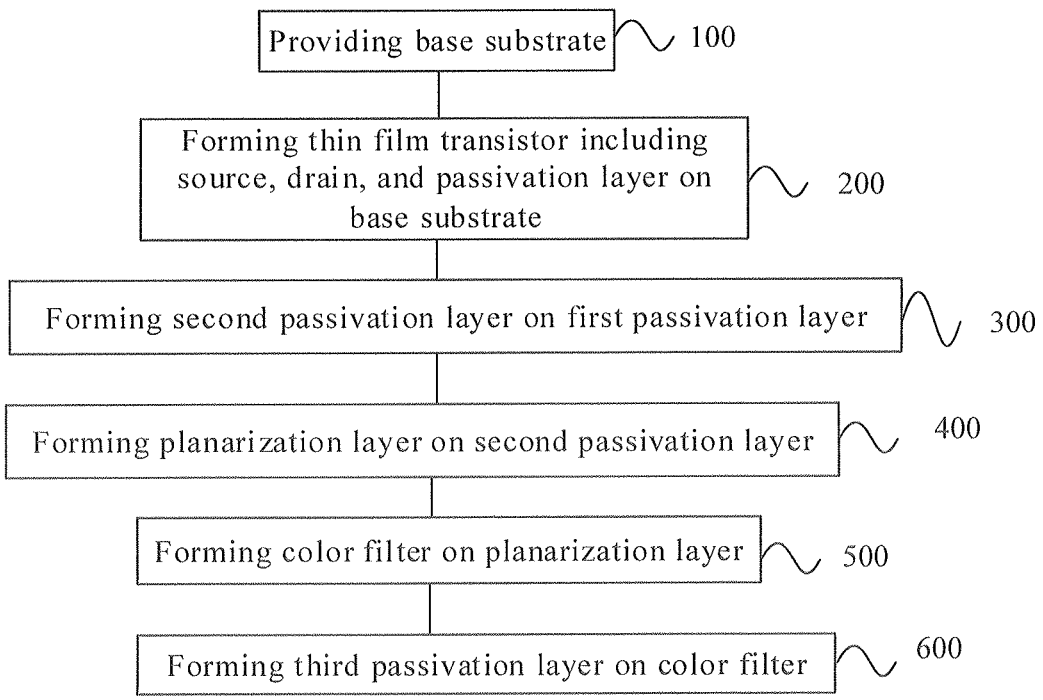
FIG. 4 is a flowchart illustrating a method for manufacturing a display panel according to an embodiment of the present disclosure.

FIG. 4 is a flowchart illustrating a method for manufacturing a display panel according to an embodiment of the present disclosure. As shown in FIG. 4, the method for manufacturing a display panel according to an embodiment of the present disclosure includes the following steps 100 to 200.

At step 100, a base substrate is provided.

The material of the base substrate may be a transparent material such as glass, plastic, quartz, or polyimide, which is not limited in the embodiments of the disclosure.

At step 200, a thin film transistor is formed on the base substrate 10, the thin film transistor including a gate 11, an insulating layer 12, an active layer 13, and a source 14 and a drain 21 arranged sequentially in a first direction parallel to a main surface S of the base substrate 10, and a passivation layer 15.

The first passivation layer 15 is formed on the source 14 and the drain 21 by a sputtering process, and a space region 150 in which the liquid crystal molecules are filled is formed in the first passivation layer 15; a crystal filling hole or hole 151 through which the liquid crystal molecules 20 is filled into the space region 150 is formed in the first passivation layer 15, and the hole 151 is in communication with the space region; and the liquid crystal molecules 20 are filled into the space region 150 through the hole 151. The source 14 and the drain 21 are configured to control rotation of the liquid crystal molecules 20.

The thin film transistor may have a top gate structure or bottom gate structure, which is not limited in the embodiments of the disclosure.

The material of the first passivation layer may be silicon oxide and/or silicon dioxide, but is not limited thereto.

The insulating layer is made of a transparent material.

The space region 150 may be disposed between the source 14 and the drain 21 so that the source 14 and the drain 21 are configured to control rotation of the liquid crystal molecules 20.

In an embodiment, a distance H1 from a highest point of the space region 150 to the main surface S of the base substrate 10 is less than a distance H2 from a highest point of the source 14 and the drain 21 to the main surface S of the base substrate 10.

The space region 150 may have a shape of any one of a square, a triangle, and a sphere. However, the shape of the space region is not limited thereto.

A distance between the source 14 and the drain 21 ranges from 10 nm to 50 μm, and each of the source 14 and the drain 21 has a height in a range of 10 nm to 20 μm.

The method for manufacturing a display panel according to an embodiment of the present disclosure includes the following steps: providing a base substrate on which a thin film transistor including a source, a drain, a gate, an active layer, an insulating layer and a first passivation layer is formed; wherein the first passivation layer is provided with a space region in which liquid crystal molecules is filled therein, and the source and the drain are configured to control rotation of the liquid crystal molecules. The manufacturing method according to the embodiments of the present disclosure does not need the cell assembly process, thereby simplifying the manufacturing process, ensuring that the liquid crystal layer is prone to malposition during the bending process, improving the pixel density of the liquid crystal display device, and achieving a better display effect.

After step 200, the method for manufacturing a display panel according to the embodiment of the present disclosure further includes the following steps 300 to 600:

at step 300, a second passivation layer 16 for sealing the hole is formed on the first passivation layer 15;

at step 400, a planarization layer 17 is formed on the second passivation layer 16;

at step 500, a color filter is formed on the planarization layer 17; and at step 600, a third passivation layer 19 for protecting the color filter is formed on the color filter.

With reference to FIGS. 5 to 8B, a method for manufacturing a display panel according to an embodiment of the present disclosure is further described taking a thin film transistor being a bottom gate structure as an example, and the patterning process of the method includes: photoresist coating, exposure, development, etching, photoresist stripping processes, and the like.

Figure 5:
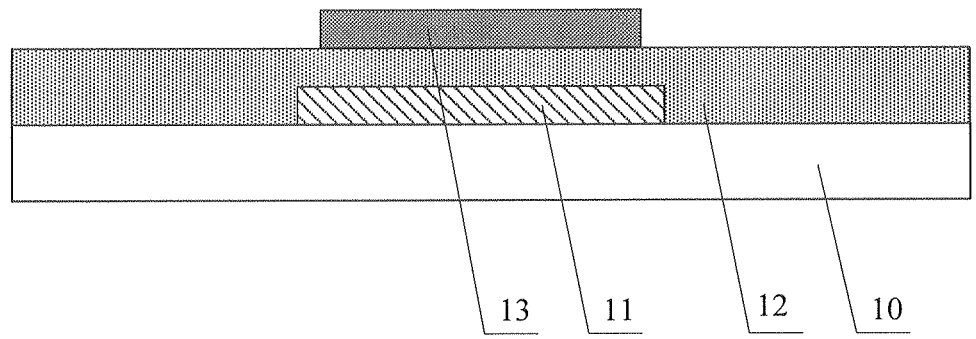
FIGS. 5 to 8B are cross-sectional views illustrating a method for manufacturing a display panel according to an embodiment of the present disclosure.

A base substrate 10 is provided, and a gate 11, an insulating layer 12 and an active layer 13 are formed on the base substrate 10, as shown in FIG. 5.

In an embodiment, the step of forming the gate 11, and the source 14 and the drain 21 on the base substrate 10 includes: forming the gate 11 on the main surface S of the base substrate 10; forming an insulating layer 12 on a side of the gate 11 distal to the base substrate 10, the insulating layer 12 covering the gate 11 and the entire base substrate 10; forming an active layer 13 on a surface of the insulating layer 12 distal to the base substrate 10; and forming the source 14 and the drain 21 arranged in the first direction on a surface of the active layer 13 distal to the base substrate 10.

A distance between the source 14 and the drain 21 ranges from 10 nm to 50 μm, and each of the source 14 and the drain 21 has a height in a range of 10 nm to 20 μm.

In an embodiment, the base substrate base 10 may be pre-cleaned before the gate 11 is formed.

Figure 6A:
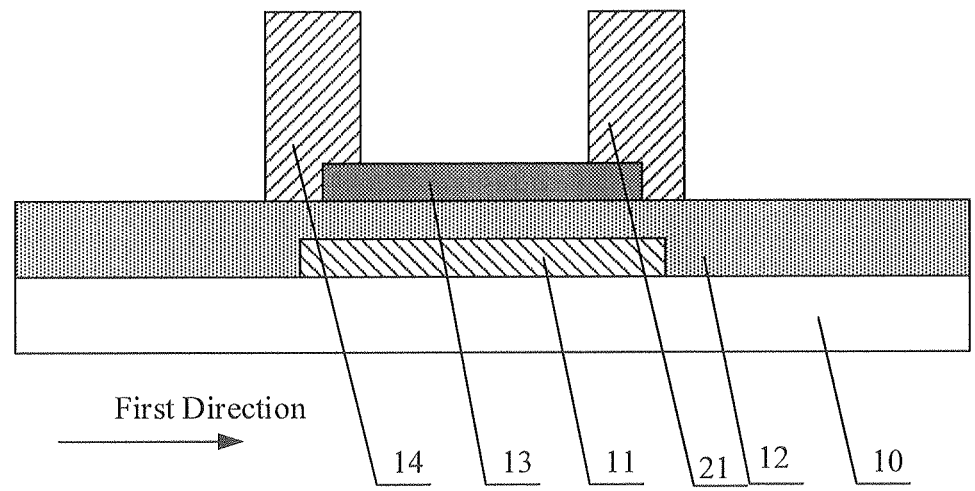
Figure 6B:
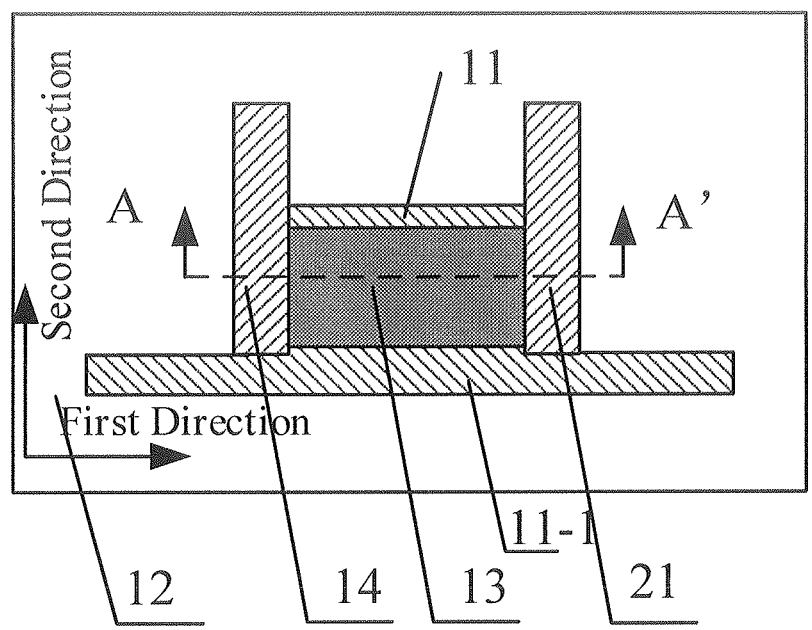

FIG. 6A is a cross-sectional view illustrating a method of manufacturing a display panel according to an embodiment of the present disclosure. FIG. 6B is a top view of the display panel shown in FIG. 6A. FIG. 6A is a cross-sectional view taken along line AA' in FIG. 6B.

Referring to FIGS. 6A and 6B, the source 14 and the drain 21 are formed on the active layer 13. The source 14 and the drain 21 are formed to extend from an edge of the active layer 13 onto a surface of the insulating layer 12 along a second direction crossing or perpendicular to the first direction. The gate 11 is connected to a gate line 11-1. In an embodiment, the source 14 and the drain 21 extend beyond another edge of the active layer, which is opposite to the edge of the active layer 13 along a direction crossing the gate line 11-1 and extend onto the surface of the insulating layer 12. The insulating layer is made of a transparent material.

The region where the active layer 13 or the gate 11 is located is defined as a light blocking region R1, and extension portions of the source 14 and the drain 21 extend from the light blocking region R1 beyond the said another edge of the active layer 13. The extension portions of the source 14 and the drain 21 define a sub-pixel region R2, and the sub-pixel region R2 is adjacent to the light blocking region R1. As described later herein, a color resist layer is to be formed in the sub-pixel region R2, and a black matrix layer is to be formed in the light blocking region R1.

In an embodiment, a distance between the source 14 and the drain 21 ranges from 10 nm to 50 μm, and each of the source 14 and the drain 21 has a height in a range of 10 nm to 2 μm.

As shown in FIG. 6B, portions (i.e., the extension portions) of the source 14 and the drain 21 that is not overlapped with the gate 11 define left and right sides (or boundaries) of one sub-pixel region, and the number of sub-pixel regions is set according to the design of the liquid crystal display device.

FIGS. 7A to 7C are cross-sectional views illustrating a method of manufacturing a display panel according to an embodiment of the present disclosure. FIG. 7D is a top view of the display panel shown in FIGS. 7A to 7C. FIG. 7A or 7B is a cross-sectional view of the light blocking region R1 taken along line AA' in FIG. 7D. FIG. 7C is a cross-sectional view of the sub-pixel region R1 taken along line BB' in FIG. 7D.

As shown in FIGS. 7A and 7B, a first passivation layer 15 and a space region 150 in the first passivation layer 15 are formed on the source 14 and the drain 21 through a one-step sputtering process. The space region 150 in the first passivation layer 15 is to be filled with liquid crystal molecules.

The material of the base substrate 10 may be a transparent material such as glass, plastic, quartz, or polyimide, which is not limited in the embodiments of the disclosure.

In addition, a hole 151 in communication with the space region is formed on the first passivation layer 15, as shown in FIG. 7D.

In an embodiment, the hole 151 is formed in the first passivation layer 15 and at a boundary or an edge of each pixel region. Since the first passivation layer 15 is formed of a high dielectric material, the source 14 and the drain 21 may form a large capacitor storing pixel data signals.

The space region 150 may be located in or not located in the light blocking region R1. FIG. 7A shows a case where the space region 150 is located in the light blocking region R1. FIG. 7B shows a case where the space region 150 is not located in the light blocking region R1.

Referring to FIG. 7C, the space region 150 is located in the sub-pixel region R2 defined by the extension portions of the source 14 and the drain 21.

In the case where the space region 150 is located in the light blocking region R1, the space region 150 in the light blocking region R1 and the space region 150 in the sub-pixel region R2 are in communication with each other and formed as one piece.

It should be noted that in some embodiments, the inventive concept of the present disclosure is described taking a case where the space region 150 is located in the light blocking region R1 as an example, but the case where the space region 150 is not located in the light blocking region R1 also falls within the protection scope of the present application.

A distance H1 from a highest point of the space region to the main surface S of the base substrate is less than a distance H2 from a highest point of the source and the drain to the main surface S of the base substrate. Therefore, all the liquid crystal molecules 20 in the space region 150 may rotate under influence of a voltage between the source 14 and the drain 21.

The space region 150 may have a shape of any one of a square, a triangle, and a sphere. The shape of the space region 150 is not limited thereto.

Figure 8A:
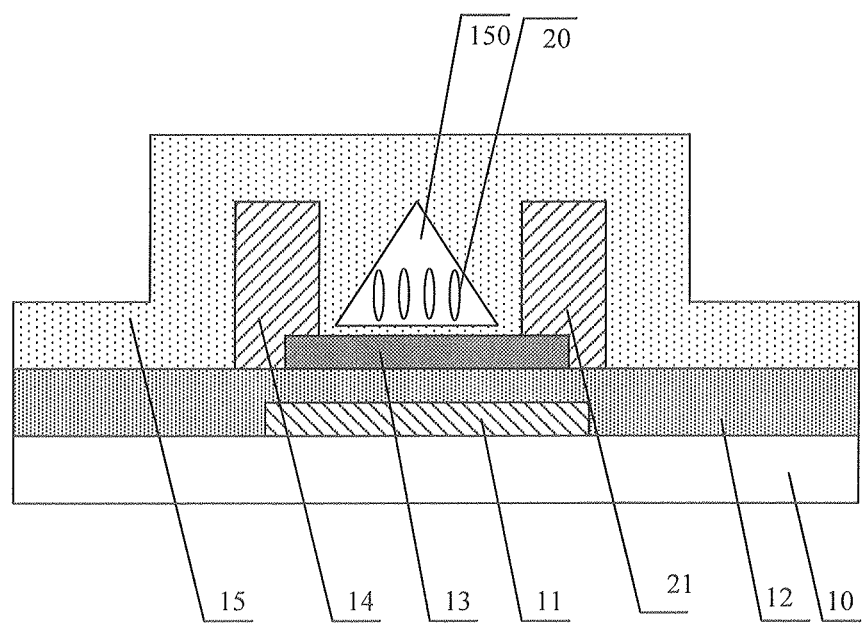
Figure 8B:
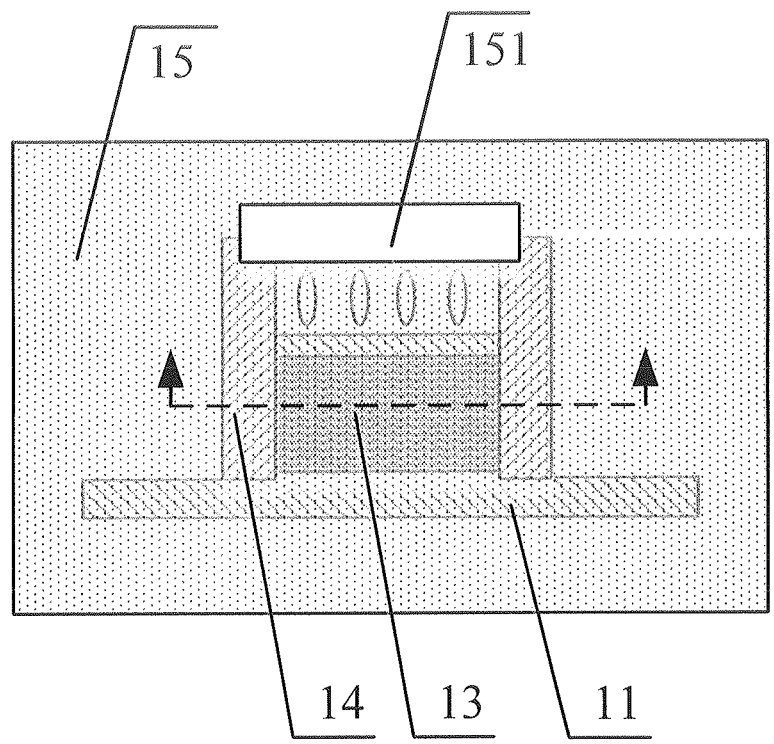

FIG. 8A is a cross-sectional view illustrating a method of manufacturing a display panel according to an embodiment of the present disclosure. FIG. 8B is a top view of the display panel shown in FIG. 8A. As shown in FIGS. 8A and 8B, the hole 151 is formed at a boundary or an edge of each sub-pixel region, and the liquid crystal molecules 20 are injected into the space region 150 through the hole 151.

Referring back to FIGS. 2A and 2B, a second passivation layer 16 for sealing the hole 151 is formed on a surface of the first passivation layer 15 distal to the base substrate 10, and then a planarization layer 17 is formed on a surface of the second passivation layer 16 distal to the base substrate 10.

Referring back to FIGS. 3A to 3C, a color filter is formed on a surface of the planarization layer 17 distal to the base substrate. The color filter is disposed in the light blocking region R1 and the sub-pixel region R2. The color filter includes a color resist layer 22 and a black matrix layer 18. The color resist layer 22 is located in the sub-pixel region R2, and an orthographic projection of the color resist layer 22 on the base substrate 10 is inside the sub-pixel region R2. The orthographic projection of the color resist layer 22 on the base substrate 10 is overlapped with an orthographic projection of the space region 150 in the sub-pixel region R2 on the base substrate 10. The black matrix layer 18 is located in the light blocking region R1 and between adjacent color resist layers 22 to separate the adjacent color resist layers 22.

Then, a third passivation layer 19 is formed on a surface of the color filter distal to the base substrate 10.

In an embodiment of the present disclosure, there is further provided a method for driving a display panel that is applied to the display panel as described above. The method for driving a display panel according to an embodiment of the present disclosure includes:

applying a driving voltage to the gate 11 of the thin film transistor so that the thin film transistor is turned off; and applying a data voltage to the source 14 and the drain 21 of the thin film transistor so that the liquid crystal molecules rotate.

When the thin film transistor is turned off due to the gate voltage of the thin film transistor, a voltage is applied to the source and the drain so that a voltage difference exists between the source and the drain. Therefore, the liquid crystal molecules rotate, light transmits through the liquid crystal molecules, and pixels corresponding to the liquid crystal molecules emit light for display. When the gate voltage of the thin film transistor is turned on due to the gate voltage of the thin film transistor, the source voltage and the drain voltage are the same as each other, and the liquid crystal molecules rotate. Therefore, light cannot transmit through the liquid crystal molecules, and the pixels corresponding to the liquid crystal molecules do not emit light.

Figure 9A:
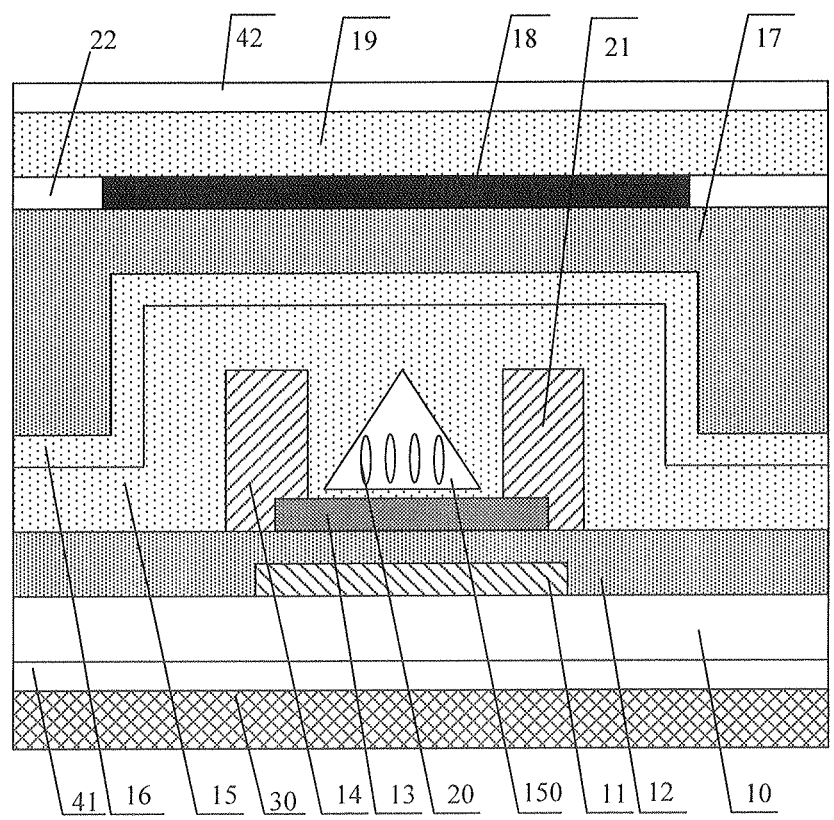
FIGS. 9A and 9B are cross-sectional views of a structure of a display device according to an embodiment of the present disclosure.
Figure 9B:
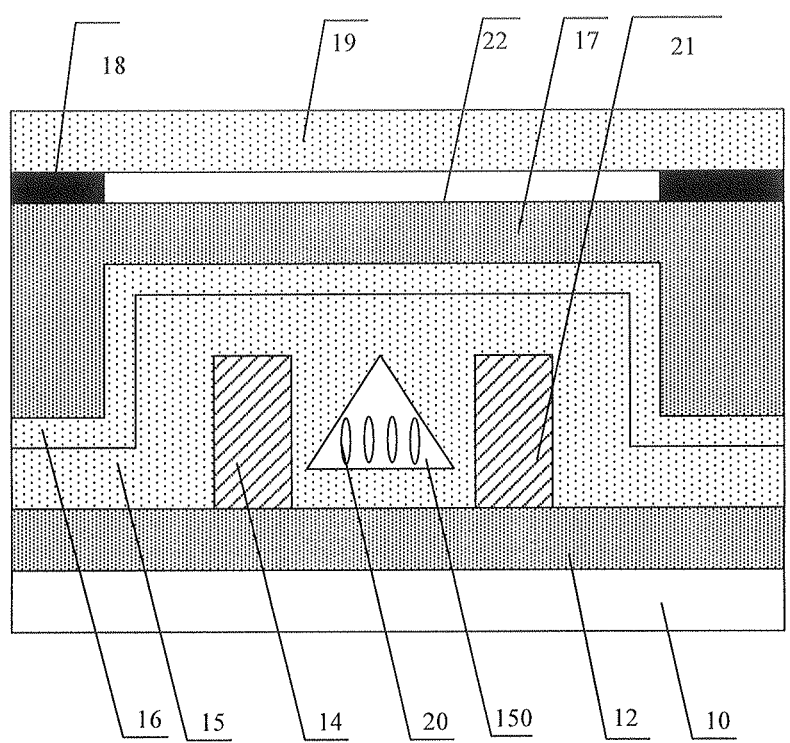

In an embodiment of the present disclosure, there is further provided a display device. FIG. 9A and FIG. 9B are a schematic structural diagram of a display device according to an embodiment of the present disclosure. As shown in FIG. 9A and FIG. 9B, the display device according to the embodiment of the disclosure includes: the display panel of any of the above embodiments, a backlight module 30, a first polarizer 41 and a second polarizer 42.

The backlight module 30 is located on a side of the base substrate 10 distal to the gate 11, the first polarizer 41 is disposed between the backlight module 30 and the base substrate 10, and the second polarizer 42 is disposed on a side of the third passivation layer 19 distal to the base substrate 10.

The backlight module 30 is configured to provide a light source for the display panel. The backlight module 30 may include: a backlight source, a light guide plate, and an optical film layer (such as a diffusion sheet, a prism sheet, or the like). However, the structure of the backlight module is not limited thereto.

In this embodiment, by disposing the first polarizer 41 and the second polarizer 42 in the display device, only the light vibrating in a specific direction among the light provided by the backlight module is allowed to transmit through the first polarizer 41 and the second polarizer 42.

The display device may be any product or component having a display function, such as a mobile phone, a tablet PC, a television, a monitor, a notebook computer, a digital album, a GPS and the like.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and essence of the present disclosure, which are also to be regarded as falling within the scope of the present disclosure

What is claimed is:

1. A display panel, comprising: a base substrate and a thin film transistor on the base substrate, the thin film transistor comprising: a gate, and a source and a drain arranged along a first direction, and a first passivation layer covering the gate, the source and the drain; wherein
    the first passivation layer is provided with a space region in which liquid crystal molecules are filled;
    the space region is between the source and the drain; and
    the source and the drain are configured to control rotation of the liquid crystal molecules, wherein
    the first passivation layer is further provided a hole through which the liquid crystal molecules are filled into the space region,
    the display panel further comprises:
    a second passivation layer on a side of the first passivation layer distal to the base substrate and seals the hole; and
    a planarization layer on a side of the second passivation layer distal to the base substrate.

2. The display panel according to claim 1, wherein
    the gate is on the base substrate;
    the thin film transistor further comprises an insulating layer and an active layer,
    the insulating layer is on a side of the gate distal to the base substrate and covers the gate and the base substrate; and
    the active layer is on a side of the insulating layer distal to the base substrate.

3. The display panel according to claim 2, wherein
    the source and the drain extend from a first edge to a second edge of the active layer and onto the insulating layer along a second direction crossing the first direction, the second edge being opposite to the first edge, and
    the space region is at least between portions of the source and the drain beyond the second edge of the active layer.

4. The display panel according to claim 3, further comprising a color filter on a side of the planarization layer distal to the base substrate, wherein
    the color filter comprises a color resist layer and a black matrix layer;
    an orthographic projection of the color resist layer on the base substrate is overlapped with an orthographic projection of the space region between the portions on the base substrate; and
    the black matrix layer is between adjacent color resist layers to separate the adjacent color resist layers.

5. The display panel according to claim 4, further comprising: a third passivation layer; wherein
    the third passivation layer is on a side of the color filter distal to the base substrate.

6. The display panel according to claim 1, wherein
    a distance from a highest point of the space region to a surface of the base substrate is less than a distance from a highest point of the source and the drain to the surface of the base substrate.

7. The display panel according to claim 1, wherein
    a distance between the source and the drain ranges from about 10 nm to 50 μm, and
    each of the source and the drain has a height in a range of about 10 nm to 20 μm.

8. A display device, comprising: the display panel according to claim 1, a backlight module, a first polarizer and a second polarizer.

9. A method for manufacturing a display panel, comprising:
    providing a base substrate;
    forming a gate, and a source and a drain arranged along a first direction on the base substrate;
    forming a first passivation layer covering the gate, the source and the drain, wherein a space region is disposed in the first passivation layer; and
    filling the space region with liquid crystal molecules, wherein
    the space region is between the source and the drain; and
    the source and the drain are configured to control rotation of the liquid crystal molecules,
    the step of filling the space region with the liquid crystal molecules comprises:
    forming a hole in communication with the space region in the first passivation layer; and
    filling the space region with the liquid crystal molecules through the hole,
    the method further comprises:
    forming a second passivation layer sealing the hole on a side of the first passivation layer distal to the base substrate; and
    forming a planarization layer on a side of the second passivation layer distal to the base substrate.

10. The method according to claim 9, wherein the step of forming the gate, and the source and the drain arranged along the first direction on the base substrate comprises:
    forming a gate on the base substrate;
    forming an insulating layer on a side of the gate distal to the base substrate, the insulating layer covering the gate and the base substrate;
    forming an active layer on a side of the insulating layer distal to the base substrate; and
    forming the source and the drain on a side of the active layer distal to the base substrate.

11. The method according to claim 10, wherein the step of forming the source and the drain on the side of the active layer distal to the base substrate comprises:
    forming the source and the drain such that the source and the drain extend from a first edge to a second edge of the active layer and onto the insulating layer along a second direction crossing the first direction, the second direction being opposite to the first edge, wherein
    the space region is at least between portions of the source and the drain beyond the second edge of the active layer.

12. The method according to claim 11, wherein the step of forming the source and the drain on the side of the active layer distal to the base substrate further comprises:
    forming the source and the drain such that:
    a distance between the source and the drain ranges from about 10 nm to 50 μm, and
    each of the source and the drain has a height in a range of about 10 nm to 20 μm.

13. The method according to claim 11, further comprising: forming a color filter on a side of the planarization layer distal to the base substrate, wherein
the color filter comprises a color resist layer and a black matrix layer;
an orthographic projection of the color resist layer on the base substrate is overlapped with an orthographic projection of the space region between the portions on the base substrate; and
the black matrix layer is between adjacent color resist layers to separate the adjacent color resist layers.

14. The method according to claim 13, further comprising forming a third passivation layer on a side of the color filter distal to the base substrate.

15. The method according to claim 9, wherein
a distance from a highest point of the space region to a surface of the base substrate is less than a distance from a highest point of the source and the drain to the surface of the base substrate.

16. A method for driving a display panel wherein the display panel comprises: a base substrate and a thin film transistor on the base substrate, the thin film transistor comprising: a gate, a source and a drain arranged along a first direction, and a first passivation layer covering the gate, the source and the drain,
the first passivation layer is provided with a space region in which liquid crystal molecules are filled,
the space region is between the source and the drain,
the source and the drain are configured to control rotation of the liquid crystal molecules,
the first passivation layer is further provided a hole through which the liquid crystal molecules are filled into the space region,
the display panel further comprises:
a second passivation layer on a side of the first passivation layer distal to the base substrate and seals the holes; and
a planarization layer on a side of the second passivation layer distal to the base substrate,
the method comprises:
applying a driving voltage to the gate of the thin film transistor so that the thin film transistor is turned off; and
applying a data voltage to the source and the drain of the thin film transistor so that the liquid crystal molecules between the source and the drain rotate.

* * * * *